(12) United States Patent
Xu

(10) Patent No.: US 6,973,610 B1
(45) Date of Patent: Dec. 6, 2005

(54) METHOD OF PROVIDING ERROR PROTECTION FOR A DATA BIT FLOW

(75) Inventor: Wen Xu, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/031,564

(22) PCT Filed: Apr. 20, 2000

(86) PCT No.: PCT/DE00/01253

§ 371 (c)(1),
(2), (4) Date: Jan. 22, 2002

(87) PCT Pub. No.: WO01/08340

PCT Pub. Date: Feb. 1, 2001

(30) Foreign Application Priority Data

Jul. 22, 1999 (DE) ................................ 199 34 505

(51) Int. Cl.[7] ................... H03M 13/35; H03M 13/01

(52) U.S. Cl. ................................................. 714/752

(58) Field of Search ................ 714/752; H03M 13/01, H03M 13/35

(56) References Cited

U.S. PATENT DOCUMENTS 5,517,508 A * 5/1996 Scott ........................... 714/776
6,024,485 A * 2/2000 Yoshida ....................... 714/784

FOREIGN PATENT DOCUMENTS

JP 04181833 A * 6/1992 ............. H04L 1/00
JP 07254861 A * 10/1995 .......... H03M 13/12

OTHER PUBLICATIONS

Xu, W.; Romme, J.; A class of multirate convolutional codes by dummy bit insertion; Global Telecommunications Conference, 2000. GLOBECOM '00. IEEE, vol.: 2, Nov. 27-Dec. 1, 2000 pp. 830-834.*
Wen Xu; Marke, M.; Using insertion convolutional code for speech tranmission over GERAN 8PSK voice bearers; Personal, Indoor and Mobile Radio Communications, 2001 12th IEEE International Symposium on , vol.: 1, Sep. 30-Oct. 3, 2001 pp.: D-119-D-123.*
Computer generated English language machine translation (from Japanese) of Japan Patent Office published document JP 07-254861; available from http://www4.ipdl.jpo.go.jp/Tokujitu/tjsogodben.ipdl?N0000=115.*
Hamilton, Kim; "Polynomial Codes over Certain Finite Fields" a paper by Irving Reed and Gustov Solomon; Mar. 31, 2000; pp. 1-19; available from http://www.cs.cornell.edu/Courses/cs722/2000sp/ReedSolomon.pdf.*
A Combined Source-Channel Video Coding Scheme for Mobile Channels, Yap et al.
Source Controlled Channel Decoding, Hagenauer.
Quality Enhancement of Coded and Corrupted Speeches in GSM Mobile Systems Using Residual Redundancy, Hindelang et al.

* cited by examiner

*Primary Examiner*—R. Stephen Dildine
(74) *Attorney, Agent, or Firm*—Bell Boyd & Lloyd LLC

(57) ABSTRACT

A method and device for providing error protection for a data bit stream in a digital telecommunications transmissions transmission system in order to reduce the bit error rate, characterized in that wherein, before channel coding, a multiplicity number of previously known dummy bits are inserted in a non-terminating fashion at predetermined bit positions in a primary data bit stream near to on both sides of information-carrying bits, in particular on both sides thereof.

13 Claims, 3 Drawing Sheets

FIG 1

| ... | $u_1$ | $u_2$ | $u_3$ | 0 | 0 | $u_4$ | $u_5$ | $u_6$ | $u_7$ | $u_8$ | 1 | $u_9$ | $u_{10}$ | ... |

FIG 3

| ... | $u_1$ | $u_2$ | $u_3$ | 0 | 0 | 0 | 0 | $u_4$ | 0 | 0 | 0 | 0 | $u_5$ | ... |

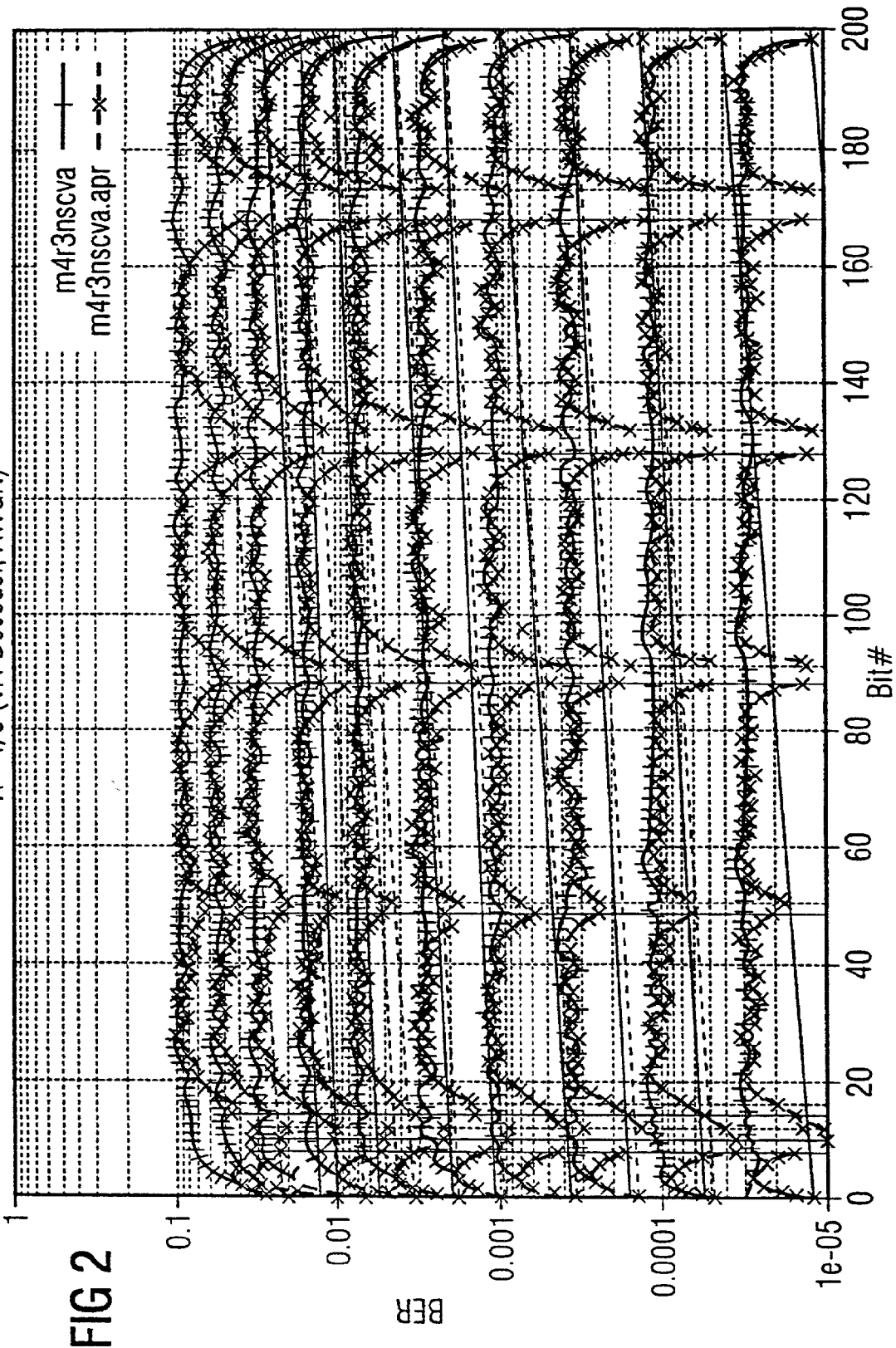

METHOD OF PROVIDING ERROR PROTECTION FOR A DATA BIT FLOW

BACKGROUND OF THE INVENTION

Source signals such as voice, sound, image and video almost always include statistical redundancy. As a result of source decoding it is possible to remove this redundancy, with the result that an efficient transition or storage of the source signal is made possible. On the other hand, when transmitting signals it is necessary to reinsert redundancy selectively via channel coding in order to eliminate channel interference.

Owing to the incomplete knowledge of the source signals or restrictions in the complexity of the coding method, the source coding usually can be implemented only in a less than optimum fashion; i.e., there is still a certain degree of redundancy in compressed data. This residual redundancy can be utilized in what is referred to as source-controlled or common channel decoding for correcting further bit errors; cf. DE 4224214 C2 and J. Hagenauer, "Source-controlled channel decoding", IEEE Trans. Commun., Vol. 43, pp. 2449–2457, Sept, 1995. Here, the decoding process of the channel decoder is controlled both by the transmitted code bits and by an Apriori-A Posteriori information item relating to the probable value of a number of important source bits. In the case of VA (Viterbi-Algorithm) decoding, this method was referred to as Apri-VA. It already has been applied successfully for the transmission of voice, sound, image and video.

The bits (information bits) generated by source coding generally have highly varying degrees of sensitivity to bit errors which can arise, for example, in digital telecommunications transmission/storage so that unequal error protection (UEP) is necessary for different bits; i.e., important bits must be better protected than less important ones.

An example is the voice codec, such as the enhanced full rate (EFR) and adaptive multirate (AMR) voice codec in the GSM standard, the speech codec being based on the CELP (code excited linear prediction). The GSM-EFR codec generates 244 bits (corresponding to 12.2 kbit/s) every 20 ms (corresponding to one frame). Errors in this bit stream have greatly varying effects on the voice quality after decoding. Errors in a large number of bits, for example, bits of LPC (linear predictive coding) coefficients, lead to incomprehensibility or loud noises, while errors in other bits (for example, bits from fixed code books) are virtually imperceptible. This has given impetus to dividing up the bits, according to the voice coder, into classes (Class 1$a$, 1$b$ and 2) which are usually differently protected against errors. In order to obtain a reasonable voice quality, it is typically necessary (depending on the type of codec and quality requirement), to protect the most important bits up to a bit error rate BER of approximately $10^{-4}$–$10^{-5}$ (after channel decoding) and to protect the least important bits up to a bit error rate BER of $10^{-1}$–$10^{-2}$. This method is referred to as the UEP method.

The customary methods for implementing a UEP are:

use of special codes which have a UEP mechanism (cf., for example, H. Ma, "Binary unequal error-protection block codes formed from convolutional codes by generalized tail-biting," IEEE Trans. Information Theory, Vol. 32, pp. 776–786, 1986).

separate channel coding of the different classes of bits (for example, in GSM-EFR; the bits of classes 1$a$ and 1$b$ are coded by a convolutional code at the rate ½ and memory m=4, and the bits of class 2 are transmitted in uncoded form).

combination of channel coding and subsequent puncturing which is adapted to the importance of the bits (example: GSM-AMR standard).

The third generation of mobile telephone systems 3GPP (third generation partner project) or UMTS (universal mobile telecommunication system) is currently being standardized. For general data transmission, a uniform structure already has been agreed (see: FIG. 4-1 and FIG. 4-2 of Transport channel multiplexing structure for uplink, in TS 25.212 V2.0.0 (1999-06), $3^{rd}$ Generation Partnership Project (3GPP); Technical Specification Group (TSG), Radio Access Network (RAN); Working Group 1 (WG1)).

The channel coding is implemented with a convolutional code (rate ½ and ⅓, constraint length m+1=9, m being referred to as code memory) or turbo codes. The rate matching serves here to repeat the code bits generated by the channel coding in accordance with the quality of the service and/or the possible (fixed) length of the data block within a transport channel (if the code bits are too few) or to puncture them (if the code bits are too many). All functional units (CRC, multiplexing, channel coding, interleaving, rate matching, etc) may be applied to the entire data block (i.e., the complete input bit stream) but not parts thereof.

Although such a structure makes the system simple and uniform for different services, it is difficult to implement a UEP, for example, for voice services, with the customary methods of channel coding. In order to adapt the importance of the AMR-coded bits, the different classes of bits should be transmitted with different levels of protection. A simple solution is to transmit the different classes of bits via different transport channels.

Disadvantages of such a UEP solution are the complicated management of the decomposition and combination of bits and the overhead necessary for these processes.

We will consider the mode 12.2 kbit/s of the AMR codec as an example. This mode has 3 classes of bits: Class A (81 bits), Class B (103 bits) and Class C (60 bits). If the 3 classes of bits are transmitted via 3 transport channels, each class firstly has, for example, 16 CRC bits (for block error detection) added to it and then 8 tail bits (if, as foreseen, the convolutional code with rate ⅓, constraint length 9 is used). The entire code bits after channel coding are 3×(81+16+8)+3×(103+16+8)+3×(60+16+8)= 948 bits, of which 3×(16+8)+3×(16+8)+3×(16+8)=216 bits, i.e., $216/948 \approx 23\%$ of all code bits, are associated with the overhead. If, however, all 244 bits are transmitted with a transport channel, the overhead is 3×(16+8)=72 bits (these bits are necessary for UMTS data transmission), i.e., $72/804 \approx 9\%$ of all code bits, where 804=(244+16+8)×3.

The present invention is, therefore, directed toward specifying an improved method of the generic type with reduced expenditure on protection (overhead) and, thus, a relatively high net information density, together with a corresponding device.

SUMMARY OF THE INVENTION

The present invention includes the fundamental idea of selective insertion of known bits before the channel coding step. These known bits, also referred to below as dummy bits, are inserted in the vicinity of the important information bits, specifically in a non-terminating fashion (in contrast with the known code termination where a known bit group is located at the end of a data block), and in particular on both sides of the information bits. The more important an information bit is, the nearer its dummy bits should be located to it and/or the more known bits should be inserted near to it.

A code with a relatively low rate is advantageously formed by inserting the previously known bits from a code with a relatively high rate. The application to a systematic code is particularly expedient, and the inserted previously known bits (dummy bits) are not included in the transmission in the code bits.

An advantageous linking to puncturing is also expedient by puncturing the code bits after application of the proposed method.

Decoding methods such as the source-controlled channel decoding can be used in conjunction with the proposed method, the maximum (absolute) apriori knowledge (the log-likelihood ratio in the case of Apri-VA algorithm) for the known bits being set at the receiver end.

Potential advantages of the proposed method are:
Simplicity of implementation. With the exception that a channel decoder which uses apriori knowledge (for example, the Apri-VA algorithm instead of the normal VA (Viterbialgorithm) is used, all other parts of the channel codec remain unchanged. As a result, a UEP can be implemented for a predetermined transmission structure (such as 3 GPP) without further modification.
Flexibility. It is easy to adapt UEP to individual information bits.
Omission of a separate overhead.

For the above example (12.2 kbit/s AMR-codec for UMTS), it is possible to transmit all 244 bits within a transport channel using the method proposed here.

While the execution, specifically in the case of unequal error protection, only requires one classification of the information bits into two classes, namely more important (more significant) and less important (less significant), in one preferred embodiment a finely graduated classification into at least three classes takes place associated with the insertion of several successive dummy bits, in each case, near to information bits with a higher significance and of one dummy bit near to information bits with medium ranking significance.

In a device which is suitable for carrying out the method according to the present invention, the coder includes parts for inserting the previously known data bits (dummy bits) at positions near to the positions of important information bits. Such a device also includes a classification device for classifying information bits according to their significance or it is at least connected to a source of corresponding classification signals; for example, to a memory device of an external classification device.

For decoding the received (convolution-coded) bit stream, it is possible, for example, to use a Viterbi-Algorithm (VA) which is modified as follows. A trellis diagram of a convolutional code is composed of branches (state transitions) and nodes, it being possible for a number of branches to come together at each node. A node represents a state of the memory of the convolutional code. For a rate 1/n convolutional code and at a specific point in time there are branches to the next point in time in the trellis diagram $2^{m+1}$ if no bit is predefined. If a dummy bit is inserted, only $2^m$ branches are then possible. The normal Viterbi decoder then can be modified in such as way that only these branches are reached. In other words, the paths which do not run over the $2^m$ branches are rejected. This method can be expanded for several dummy bits and other codes.

Here, such a system includes a sequence controller for controlling the corresponding tests for the data bit streams processed via a number of paths in the trellis diagram, by reference to the positions and the values of the dummy bits, as well as a decision unit which is connected to the comparative device and makes a decision to reject or to confirm or select a path as a function of the result of the comparison which is respectively made.

In a further preferred embodiment, such an overall system includes a source-controlled channel decoder which implements, in particular, an Apri-Viterbi-Algorithm or MAP-Algorithm. Such a channel decoder includes a database for what are referred to as "L values" (values of the log-likelihood ratio) of the inserted known bits.

The proposed method has particular practical significance for the error-protected transmission of source signals; in particular, voice signals. It is therefore particularly suitable for application in a mobile telephone system.

Additional features and advantages of the present invention are described in, and will be apparent from, the following Detailed Description of the Invention and the Figures.

BRIEF DESCRIPTION OF THE FIGURES

FIG. 1 shows a schematic view of a data bit stream before the channel coding or upstream of the corresponding apriori knowledge base for channel decoding.

FIG. 2 shows a simulation of the BER as a function of the bit number of a VA decoder of an AWGN channel.

FIG. 3 shows a view of the protection of a convolutional code with predetermined dummy bits.

DETAILED DESCRIPTION OF THE INVENTION

Figure 4:
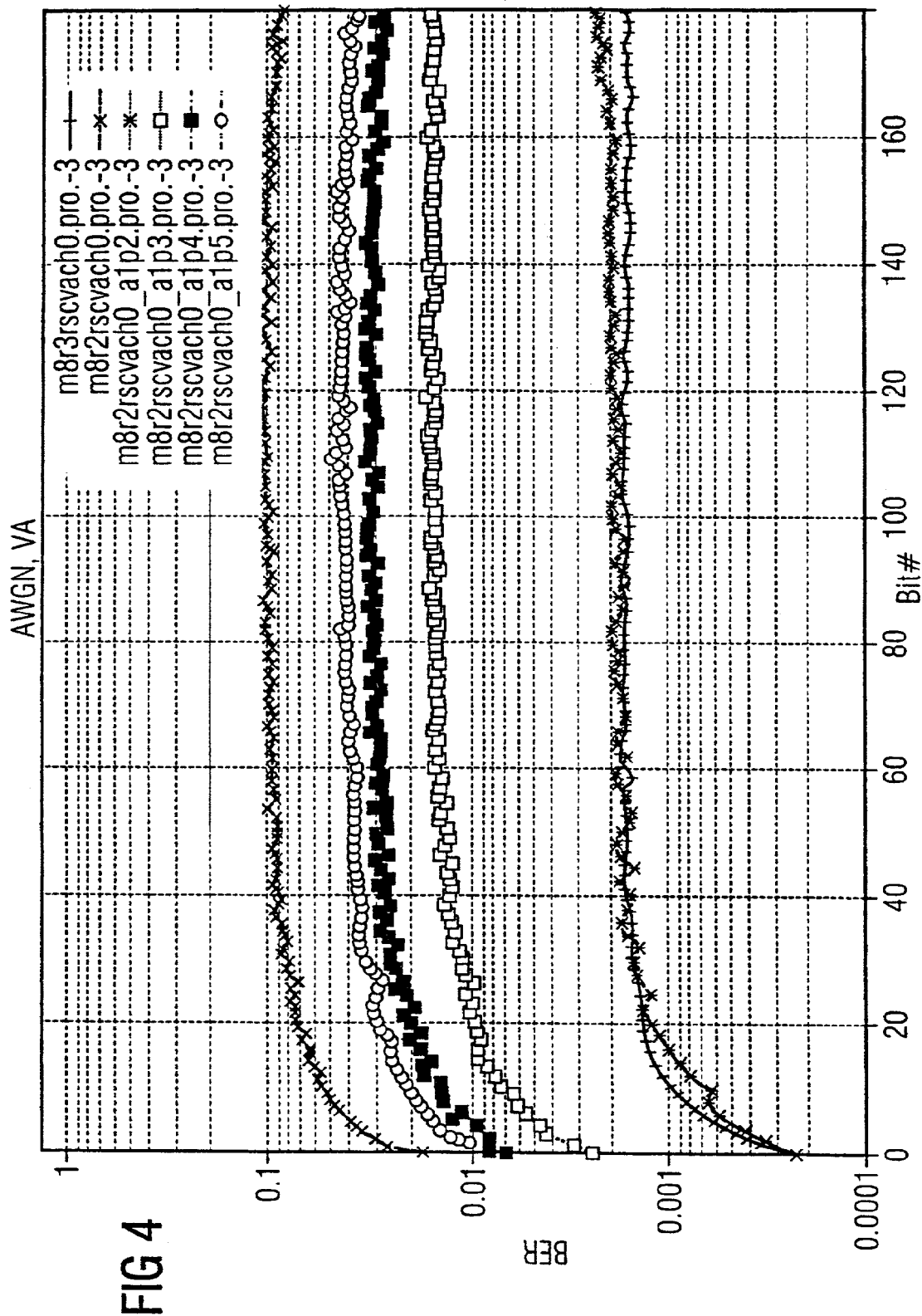
FIG. 4 shows a view of the simulation of an RSC code of an AWGN channel.

As illustrated in FIG. 1, the bits $u_3$ and $u_4$ should be better protected than $u_8$ and $u_9$, which are, in turn, better protected than $u_1$, $u_6$, $U_7$, . . . Two known bits ("0" or "1") can then be inserted between $u_3$ and $u_4$ and a known bit ("0" or "1") can be inserted between $u_8$ and $u_9$. This apriori knowledge should be used at the decoding end; i.e., the two bits between $u_3$ and $u_4$ are "0" and the bit between $u_8$ and $u_9$ is "1".

The following methods are possible for decoding:
In the case of a normal VA, it is possible, for example, to use this apriori knowledge in the selection of the possible paths; i.e., paths with which the known bits are incorrectly decoded are rejected. This is similar to the termination of a convolutional code.
When an Apri-VA or a similar algorithm, for example, the MAP (maximum a posteriori probability) decoding algorithm, is used, the apriori L values for the known dummy bits can be used as acceptable maximum values (e.g. L=+∞ for bit "0" and L=−∞ for bit "1"). For the information bits $u_1$, $u_2$, $u_3$, $u_4$, . . . $L_i$=0 (i=1, 2, . . . ) if no apriori knowledge is present.
For systematic channel codes such as, for example, the recursive systematic convolutional codes which are already used in the GSM-AMR channel coding and also as component codes in turbo codes, the Apriori L value of an information bit firstly can be added to the channel soft value (i.e., soft input value of the channel decoder) of the corresponding systematic code bit (= information bit) and the resulting soft value then can be used as a soft input value of the channel decoder. In this way, a channel decoder which uses Apriori knowledge (for example, the Apri-VA algorithm) can be implemented directly with a conventional VA (without modification).

FIG. 2 shows the simulation results for a convolutional code with constraint length m+1=5 and rate ⅓ under an AWGN (additive white Gaussian noise) channel. The block length is 200 (bit 0 ... 199). The generator polynomials used are $$G_1 = 1 + D^3 + D^4$$

$$G_2 = 1 + D + D^2 + D^4$$

$$G_3 = 1 + D^2 + D^3 D^4$$

the codes having a known initial state and being terminated at the end of the data block with m tailbits (4 bits=0 in our case).

The unbroken lines (with symbol "+") show the BER of all 200 information bits using normal coding/decoding (without dummy bits), and the broken lines (with the symbol "x") show the BER if known dummy bits are at the bit positions 9, 11, 15, 49, 89, 90, 129, 130, 131, 169, 170, 171, 172 (and the Apri-VA is used here). It is possible to infer that without taking into account the dummy bits whose BER=0, the information bits directly next to the dummy bits have a lower BER than the information bits a long way from the dummy bits. As a result, a UEP is achieved. The various parallel lines represent the various channel conditions (from top to bottom, the signal-to-noise ratio S/N=−5.0, −4.5, −4.0, −3.5, −3.0, −2.5, −2.0, −1.5, −1.0. . . ).

It is to be noted:

that the bits at the start and end of the datablock likewise have a lower BER. This is a consequence of the known starting states and final states (if terminated) of the convolutional code. In fact, the method proposed here is based on a similar principle to code termination. The difference is that during the termination the known bits are used only at the end of the datablock (all at once) because otherwise without termination the bits at the end of the datablock are significantly less well protected than the other bits. On the other hand, in our proposal, the known bits in the vicinity of the bits which are to be better protected are generally used more than once.

by using additional dummy bits (i.e., inserting more redundancy), the information bits are always better protected. There is no degradation of the performance.

the additional protective effect of the dummy bits is also basically restricted to the constraint length of the code, similarly to the termination of a convolutional code. Depending on how many dummy bits are used, the protective range can be 2 to 3 times the constraint length (m+1). If, for example, the constraint length is equal to 5, the bits which are at a distance of up to 10–15 bits from the dummy bits can be additionally protected.

for a normal non-systematic convolutional code, not more than m bits are to be used in succession as dummy bits (m=code memory), because with m bits the code is already terminated; i.e., a further reduction of the BER by more than m bits is not possible.

FIG. 3 shows that the bit $u_4$ is best protected by 8 dummy bits (4 on the left-hand side and 4 on the right-hand side) for a non-systematic convolutional code where m=4.

The above explanations apply to convolutional codes, but the principle can be applied to all codes for which correlation between the code bits placed in a serial arrangement is present after coding (for example, turbo codes).

The proposed method is particularly attractive and efficient for systematic channel codes (for example, the recursive systematic convolutional/RSC codes or turbo codes) because the identical inserted dummy bits (for example, "0's") are mirrored into the code words (as systematic code bits) and do not need to be transmitted.

This will be explained with an example: If the bits a-b-c-0-d-0-e-f-g-... are channel-coded with a code with a rate ½ and transmitted where a-b-c-d-e-f-g are the data bits and d is to be protected better by inserting two 0's, the coded bits (code bits or code words) have a form aA-bB-cC-OX-dD-OX-eE-fF-gG-... in the case of a systematic code. Here, X∈{0, 1} applies to a, A, b, B, ..., and in general X=a desired number (the first X is not necessarily equal to the second X). Because the two dummy bits 0 at the receiver end are known, we only need to transmit the bits aA-bB-cC-X-dD-X-eE-fF-gG-... . The dummy bits which are not transmitted can, if appropriate, be reset before decoding (with maximum reliability). This corresponds to a lower equivalent code rate. In the case of a non-systematic code, the coded bits generally have a form AA-BB-CC-XX-DD-XX-EE-FF-GG which should/must all be transmitted.

All codes with relatively low rates generally can be formed (systematically or non-systematically) from codes with relatively high rates using this method (see the following example). It is, therefore, possible for this method to be combined with puncturing via which codes with relatively high rates can be generated from codes with relatively low rates in order to achieve a desired (any) code rate and/or an optimum performance.

For example: We can form a systematic code with the rate ⅓ from a systematic code with the rate ½, namely by regular insertion of 0: a-0-b-0-c-0-d-0-... If these bits are coded with a rate ½ code, aA-0X-bB-0X-cC-0X-dD-0X-... are obtained. The bits to be transmitted are then aA-X-bB-X-cC-X-dD-X-... . The equivalent code rate is ⅓ because a rate ⅓ code generates the same number of code bits, specifically aAX-bBX-cCX-dDX-... . Similarly, we can form codes of equivalent rates ⅖ (a-b-c0-c-d-0-e ...), 3/7 (a-b-c-0-d-e-f-0-...), ... from a systematic code with a rate ½. In our simulation it has been shown that a rate ⅓ code which is formed in this way almost supplies the same performance as the optimum rate ⅓ code.

The following information applies to FIG. 4: m=8, AWGN channel, RSC code with the polynorms from TS 25.212 V2.0.0 (1999-06), 3rd Generation Partnership Project (3GPP); Technical Specification Group (TSG), Radio Access Network (RAN); Working Group 1 (WG1), where m8r2rscvach0.pro.−3=code with a rate ½, channel $E_S/N_{0=-3}$ dB m8r2rscvach0.pro.−3=code with a rate ⅓, channel $E_S/N_{0=-3}$ dB m8r2rscvach0_a1p2.pro.−3=code with an equivalent rate of ⅓, channel $E_S/N_{0=-3}$ dB (proposed method)

m8r2rscvach0_a1p3.pro.−3=code with an equivalent rate of ⅖, channel $E_S/N_{0=-3}$ dB (proposed method)

m8r2rscvach0_a1p4.pro.−3=code with an equivalent rate of 3/7, channel $E_S/N_{0=-3}$ dB (proposed method)

m8r2rscvach0_a1p5.pro.−3=code with an equivalent rate of 4/9, channel $E_S/N_{0=-3}$ dB (proposed method)

Although the present invention has been described with reference to specific embodiments, those of skill in the art will recognize that changes may be made thereto without departing from the spirit and scope of the invention as set forth in the hereafter appended claims.

What is claimed is:

1. A method for providing error protection for a data bit stream in a digital telecommunications transmission system for reducing a bit error rate, the method comprising the steps of:
   establishing a plurality of known dummy bits; and
   inserting, before channel coding, the plurality of known dummy bits in a non-terminating fashion at predetermined bit positions in a primary data bit stream on both sides of information-carrying bits;
   wherein the method is applied to a systematic code, the dummy bits not being transmitted in code bits.

2. A method for providing error protection for a data bit stream in a digital telecommunications transmission system as claimed in claim 1, the method further comprising the step of forming a code with a relatively low rate from a code with a relatively high rate via the insertion of the known dummy bits.

3. A method for providing error protection for a data bit stream in a digital telecommunications transmission system as claimed in claim 1, wherein the code bits are subsequently punctured.

4. A method for providing error protection for a data bit stream in a digital telecommunications transmission system as claimed in claim 3, wherein the method is applied to a convolutional code.

5. A method for providing error protection for a data bit stream in a digital telecommunications transmission system as claimed in claim 3, the method further comprising the step of carrying out a path selection, at a receiver end, within a framework of a Viterbi algorithm, based on the protected data bit stream, a resemblance between the process data bit stream and the protected data bit stream being checked in each case at locations of the dummy bits and the respective path being rejected in the case of non-correspondence.

6. A method for providing error protection for a data bit stream in a digital telecommunications transmission system as claimed in claim 5, the method further comprising the step of decoding the protected data bit stream as source-controlled channel decoding via one of an Apri-Viterbi algorithm and a MAP algorithm.

7. A method for providing error protection for a data bit stream in a digital telecommunications transmission system as claimed in claim 5, the method further comprising the steps of:
   adding an Apriori-L value of an information bit to a soft input value of the corresponding systematic code bit for a recursive, systematic convolutional code; and
   effecting decoding via a conventional Viterbi algorithm.

8. A method for providing error protection for a data bit stream in a digital telecommunications transmission system as claimed in claim 1, the method further comprising the step of subjecting the information-carrying bits of the primary data bit stream to classification of their significance into at least two classes, wherein the dummy bits are inserted near the information-carrying bits which carry information to a significant degree.

9. A method for providing error protection for a data bit stream in a digital telecommunications transmission system as claimed in claim 1, wherein the method is applied in a mobile telephone system.

10. A method for providing error protection for a data bit stream in a digital telecommunications transmission system as claimed in claim 1, wherein the method is applied for transmission of voice signals.

11. A device for providing error protection for a data bit stream in a digital telecommunications transmission system for reducing a bit error rate, the device comprising a coder for inserting previously known data bits at predetermined bit positions of a primary data bit stream to be coded, and a classification device for classifying a significance of the information bits of the primary data bit stream, an output of the classification device being connected to a controller for controlling the insertion of the known data bits.

12. A device for providing error protection for a data bit stream in a digital telecommunications transmission system as claimed in claim 11, wherein for decoding information bits via a Viterbi algorithm, the device further comprises:
   a sequencing control unit for controlling checking of a plurality of paths for the received data bit stream;
   a comparitor unit for checking the data bit streams which are processed via a plurality of paths, by reference to the positions and values of the dummy bits; and
   a decision unit, connected to an output of the comparitor unit, for rejecting or approving the path assigned to the respectively tested data bit stream as a result of the comparison.

13. A device for providing error protection for a data bit stream in a digital telecommunications transmission system as claimed in claim 11, further comprising a source-controlled channel decoder for executing one of an Apri-Viterbi algorithm and a MAP algorithm.

* * * * *